US012134886B2

(12) United States Patent
Coppola

(10) Patent No.: US 12,134,886 B2
(45) Date of Patent: Nov. 5, 2024

(54) WATER INLET PROTECTION SYSTEM

(71) Applicant: FLO-WATER, LLC, West Des Moines, IA (US)

(72) Inventor: Corydon Coppola, West Des Moines, IA (US)

(73) Assignee: FLO-WATER, LLC, West Des Moines, IA (US)

( * ) Notice: Subject to any disclaimer, the term of this patent is extended or adjusted under 35 U.S.C. 154(b) by 238 days.

(21) Appl. No.: 17/879,908

(22) Filed: Aug. 3, 2022

(65) Prior Publication Data

US 2023/0018046 A1    Jan. 19, 2023

Related U.S. Application Data

(63) Continuation-in-part of application No. 17/837,281, filed on Jun. 10, 2022, which is a continuation of
(Continued)

(51) Int. Cl.
| | |
|---|---|
| *E03F 5/16* | (2006.01) |
| *B01D 29/27* | (2006.01) |
| *B01D 35/02* | (2006.01) |
| *C02F 1/00* | (2023.01) |
| *C02F 103/00* | (2006.01) |

(Continued)

(52) U.S. Cl.
CPC .............. *E03F 5/16* (2013.01); *B01D 29/27* (2013.01); *B01D 35/02* (2013.01); *C02F 1/001* (2013.01); *C02F 1/004* (2013.01); *E03F 5/0404* (2013.01); *C02F 2103/001* (2013.01);
(Continued)

(58) Field of Classification Search
None
See application file for complete search history.

(56) References Cited

U.S. PATENT DOCUMENTS

| | | | | |
|---|---|---|---|---|
| 143,774 A | * | 10/1873 | Moore ................... | B01D 29/05 |
| | | | | 210/247 |
| 530,816 A | | 12/1894 | Weight | |

(Continued)

OTHER PUBLICATIONS

Consolidated Edison, Images of Competitor Products, not published, Third Party Email Correspondence, 2 pages.
(Continued)

*Primary Examiner* — Robert J Popovics
(74) *Attorney, Agent, or Firm* — Fredrikson & Byron, P.A.

(57) ABSTRACT

A water inlet protection system is provided. The system may an adjustable frame defining an interior cavity, the adjustable frame including a plurality of rigid base members, a plurality of slidable corner members, a plurality of nut-and-bolt fasteners, and one or more tabs extending from one or more of the corner members. Each of the slidable corner members includes one or more slots, and each of the nut-and-bolt fasteners includes a bolt that extends through one of the one or more slots and one of the rigid base members. When the respective bolt is loosened, the respective slidable corner member is slidable along the respective slot atop the respective rigid base member, thereby altering a boundary of the interior cavity. When the respective bolt is tightened, the respective slidable corner member is fixed in place atop the respective rigid base member, thereby fixing the boundary of the interior cavity.

9 Claims, 11 Drawing Sheets

Related U.S. Application Data application No. 15/359,907, filed on Nov. 23, 2016, now abandoned.

(60) Provisional application No. 62/259,985, filed on Nov. 25, 2015.

(51) Int. Cl.
    *E03F 5/04*     (2006.01)
    *E03F 5/06*     (2006.01)

(52) U.S. Cl.
    CPC .... *C02F 2201/002* (2013.01); *C02F 2307/00* (2013.01); *E03F 5/06* (2013.01)

(56) References Cited

U.S. PATENT DOCUMENTS

| | | | | |
|---|---|---|---|---|
| 1,325,961 | A * | 12/1919 | Smith | E06B 9/06 55/496 |
| 1,470,658 | A * | 10/1923 | Wall | E06B 9/522 160/373 |
| 1,659,364 | A | 2/1928 | Kelley | |
| 1,746,121 | A | 2/1930 | Levy | |
| 1,774,793 | A | 9/1930 | Egan | |
| 1,997,445 | A * | 4/1935 | Baumgardner | E06B 9/522 160/374 |
| 2,102,310 | A | 12/1937 | Egan | |
| 2,159,403 | A * | 5/1939 | Rivard | E06B 9/52 160/374 |
| 2,175,903 | A * | 10/1939 | Lichtman | B01D 46/10 55/491 |
| 2,246,580 | A * | 6/1941 | Farmer | E06B 9/01 220/8 |
| 2,263,259 | A | 11/1941 | Boosey | |
| 2,414,487 | A | 1/1947 | Schuttler | |
| 2,565,698 | A * | 8/1951 | Patterson | E04C 2/384 52/645 |
| 2,615,526 | A | 10/1952 | Lane | |
| 2,624,405 | A | 1/1953 | Lynch | |
| 2,664,258 | A * | 12/1953 | Lanier | B65D 21/08 248/172 |
| 2,849,745 | A * | 9/1958 | Madsen | A47L 4/04 248/172 |
| 3,215,382 | A * | 11/1965 | Stein | A47D 11/02 248/172 |
| 3,282,430 | A | 11/1966 | Kinne | |
| 3,345,068 | A * | 10/1967 | Bowen | A63B 5/22 273/444 |
| 3,392,844 | A | 7/1968 | Decarie | |
| 3,445,973 | A | 5/1969 | Stone | |
| 3,675,402 | A * | 7/1972 | Weed | F24F 13/28 160/374 |
| 3,773,428 | A * | 11/1973 | Bowman | E02D 29/1409 404/26 |
| 3,797,194 | A * | 3/1974 | Ekstein | F16B 17/004 403/295 |
| 3,799,488 | A * | 3/1974 | Sena | A47B 97/08 248/452 |
| 3,811,209 | A | 5/1974 | Hanley | |
| 3,985,168 | A * | 10/1976 | Lundquist | B23Q 35/44 144/144.1 |
| D256,948 | S | 9/1980 | Boersma | |
| 4,268,390 | A | 5/1981 | Cunningham | |
| 4,322,901 | A * | 4/1982 | Spitzke | D06C 3/08 38/102.6 |
| 4,419,232 | A | 12/1983 | Arntyr et al. | |
| 4,594,157 | A | 6/1986 | Mcgowan | |
| 4,610,566 | A | 9/1986 | Albang et al. | |
| D286,255 | S * | 10/1986 | Gage | D7/332 |
| 4,637,752 | A * | 1/1987 | Centa | E02D 29/14 404/25 |
| 4,655,913 | A | 4/1987 | Boersma | |
| 4,737,174 | A * | 4/1988 | Pontius | B01D 53/0407 55/491 |
| 4,838,732 | A | 6/1989 | Clark et al. | |
| 4,867,600 | A * | 9/1989 | Bowman | E02D 29/124 404/26 |
| 4,963,053 | A * | 10/1990 | Bowman | E02D 29/14 404/26 |
| 4,964,988 | A | 10/1990 | Mueller | |
| 4,966,489 | A * | 10/1990 | Bowman | E02D 29/14 404/26 |
| 4,988,234 | A | 1/1991 | Henkel et al. | |
| 5,039,248 | A * | 8/1991 | Bowman | E02D 29/124 404/26 |
| 5,052,851 | A * | 10/1991 | Frishauf | E02D 29/14 404/25 |
| 5,080,320 | A * | 1/1992 | Chieng | B41J 29/06 248/676 |
| 5,125,605 | A * | 6/1992 | Guerrera | B65B 67/12 248/101 |
| 5,133,619 | A | 7/1992 | Murfae et al. | |
| 5,173,181 | A | 12/1992 | Mcfarland | |
| 5,188,646 | A * | 2/1993 | Nolen, Jr. | B01D 46/009 55/528 |
| 5,222,704 | A * | 6/1993 | Light | B65F 1/06 220/495.08 |
| 5,223,154 | A | 6/1993 | Macpherson, Jr. et al. | |
| 5,234,582 | A | 8/1993 | Savoie | |
| 5,316,407 | A * | 5/1994 | Miller | E02D 29/14 404/25 |
| 5,333,385 | A * | 8/1994 | Chou | B23Q 9/0035 30/310 |
| 5,364,458 | A * | 11/1994 | Burnett | B03C 3/155 96/68 |
| 5,372,714 | A | 12/1994 | Logue, Jr. | |
| 5,405,539 | A | 4/1995 | Schneider | |
| 5,421,862 | A * | 6/1995 | Davis | B01D 46/88 55/491 |
| 5,476,526 | A * | 12/1995 | Attermeyer | B01D 46/0002 55/496 |
| 5,527,131 | A | 6/1996 | Salmond et al. | |
| 5,575,925 | A | 11/1996 | Logue, Jr. | |
| 5,599,031 | A * | 2/1997 | Hodges | B62B 5/0083 280/35 |
| 5,611,640 | A * | 3/1997 | Bowman | E02D 29/1427 404/26 |
| 5,632,888 | A | 5/1997 | Chinn et al. | |
| 5,650,065 | A | 7/1997 | Sewell | |
| 5,697,729 | A * | 12/1997 | Bowman | E02D 29/1427 404/25 |
| 5,702,595 | A | 12/1997 | Mossburg, Jr. | |
| 5,725,782 | A | 3/1998 | Chinn et al. | |
| 5,733,445 | A | 3/1998 | Fanelli | |
| 5,772,713 | A * | 6/1998 | Salinas | B01D 46/10 359/882 |
| 5,927,668 | A | 7/1999 | Cyrell | |
| 5,954,952 | A | 9/1999 | Strawser, Sr. | |
| 5,968,217 | A | 10/1999 | Stein et al. | |
| 5,985,157 | A | 11/1999 | Leckner et al. | |
| 6,007,270 | A * | 12/1999 | Bowman | E02D 29/1427 404/26 |
| 6,007,596 | A * | 12/1999 | Rosen | B01D 46/0002 55/491 |
| 6,010,622 | A | 1/2000 | Chinn et al. | |
| 6,015,489 | A | 1/2000 | Allen et al. | |
| 6,017,166 | A | 1/2000 | Mossburg | |
| 6,045,691 | A | 4/2000 | Mcdermott | |
| 6,086,758 | A | 7/2000 | Schilling et al. | |
| 6,106,706 | A | 8/2000 | Roy et al. | |
| 6,149,803 | A | 11/2000 | Diloreto, Jr. et al. | |
| 6,165,357 | A | 12/2000 | Cormier | |
| 6,176,281 | B1 | 1/2001 | Newman | |
| 6,214,216 | B1 | 4/2001 | Isaacson | |
| 6,274,036 | B1 | 8/2001 | Ellis | |
| 6,294,095 | B1 | 9/2001 | Lewis | |
| D449,912 | S * | 10/2001 | Henriksson | D34/6 |
| 6,306,293 | B1 | 10/2001 | Schilling et al. | |
| 6,318,692 | B1 | 11/2001 | Cyrell | |
| 6,319,300 | B1 * | 11/2001 | Chen | B01D 46/10 55/497 |

(56) References Cited

U.S. PATENT DOCUMENTS

| | | |
|---|---|---|
| 6,398,174 B1 | 6/2002 | Emalfarb |
| 6,453,482 B1 | 9/2002 | Mullings |
| 6,464,745 B2 * | 10/2002 | Rivera ................. B01D 46/523 |
| | | 55/497 |
| 6,503,390 B1 | 1/2003 | Gannon |
| 6,517,709 B1 | 2/2003 | Cardwell et al. |
| 6,521,122 B1 | 2/2003 | Elliot et al. |
| 6,530,722 B1 | 3/2003 | Shaw et al. |
| 6,531,059 B1 | 3/2003 | Morris et al. |
| 6,551,023 B2 | 4/2003 | Allard |
| 6,551,505 B2 | 4/2003 | Chinn et al. |
| 6,554,997 B1 | 4/2003 | Schilling et al. |
| 6,562,233 B1 | 5/2003 | Schilling et al. |
| 6,581,954 B2 * | 6/2003 | Chadwick ................. B60R 9/10 |
| | | 280/491.1 |
| 6,604,306 B1 * | 8/2003 | Burroughs ............... D05C 1/02 |
| | | 38/102.4 |
| 6,666,974 B2 | 12/2003 | Page |
| 6,692,188 B1 | 2/2004 | Walker et al. |
| 6,706,172 B2 | 3/2004 | Strawser |
| 6,709,579 B1 | 3/2004 | Singleton et al. |
| 6,716,267 B2 | 4/2004 | Lawlor |
| 6,749,746 B2 | 6/2004 | Mokrzycki |
| 6,790,261 B1 | 9/2004 | Delts |
| 6,808,623 B2 | 10/2004 | Harris et al. |
| 6,872,029 B2 | 3/2005 | Allard et al. |
| 6,884,343 B2 | 4/2005 | Harris et al. |
| 6,908,549 B2 | 6/2005 | Middleton et al. |
| 6,974,540 B1 | 12/2005 | Fleischmann |
| 6,986,621 B2 | 1/2006 | Allard |
| 6,998,039 B2 | 2/2006 | Harris et al. |
| 7,040,838 B2 | 5/2006 | Allard et al. |
| 7,070,691 B2 | 7/2006 | Lindemulder |
| 7,073,768 B2 * | 7/2006 | Piscovich ............. E03F 5/0401 |
| | | 249/207 |
| 7,074,326 B2 | 7/2006 | Singleton |
| 7,094,338 B2 | 8/2006 | Morris et al. |
| 7,112,274 B1 | 9/2006 | Sanguinetti |
| 7,128,495 B1 | 10/2006 | Lill et al. |
| 7,131,787 B2 | 11/2006 | Mcginn |
| 7,156,987 B1 | 1/2007 | Sanguinetti |
| 7,179,371 B1 | 2/2007 | Bistline |
| 7,186,333 B2 | 3/2007 | Kluge |
| 7,201,843 B2 | 4/2007 | Sasaki et al. |
| 7,208,082 B2 | 4/2007 | Hurst et al. |
| 7,300,574 B1 | 11/2007 | Lewis |
| D563,529 S | 3/2008 | Labonte |
| 7,357,861 B2 | 4/2008 | Kelley et al. |
| 7,422,682 B2 | 9/2008 | Mcphillips |
| 7,455,766 B1 | 11/2008 | Lewis |
| 7,481,921 B2 | 1/2009 | Kent |
| 7,524,362 B2 * | 4/2009 | Wu .................... B01D 46/0005 |
| | | 96/417 |
| 7,524,414 B1 | 4/2009 | Barragan |
| 7,544,016 B2 | 6/2009 | Mcginn et al. |
| 7,549,820 B1 | 6/2009 | Happel |
| 7,611,304 B2 | 11/2009 | Lill et al. |
| 7,624,548 B2 * | 12/2009 | Hansen ................. E04G 21/241 |
| | | 49/505 |
| 7,658,857 B2 | 2/2010 | Wacome |
| 7,670,483 B2 | 3/2010 | Ringenbach et al. |
| 7,699,978 B2 * | 4/2010 | Dyer .................... E03F 5/0404 |
| | | 210/163 |
| 7,771,591 B2 | 8/2010 | Lucas |
| 7,780,372 B2 | 8/2010 | Fattori et al. |
| 7,815,400 B2 | 10/2010 | Deangelis |
| 7,837,869 B2 | 11/2010 | Peters, Jr. et al. |
| 7,854,781 B2 | 12/2010 | Kerrigan et al. |
| 7,879,233 B2 | 2/2011 | Shaw et al. |
| 7,887,257 B2 | 2/2011 | Shaw et al. |
| 7,922,916 B1 | 4/2011 | Witt |
| 7,950,075 B2 | 5/2011 | Evans, Jr. et al. |
| 7,959,799 B2 | 6/2011 | Happel et al. |
| 7,981,300 B2 | 7/2011 | Wacome |
| 8,002,977 B2 | 8/2011 | Shaw et al. |
| 8,012,346 B2 | 9/2011 | Peters, Jr. et al. |
| 8,017,005 B2 | 9/2011 | Ringenbach et al. |
| 8,017,006 B2 | 9/2011 | Lopez |
| 8,043,498 B2 | 10/2011 | Rueda |
| 8,051,568 B2 | 11/2011 | Moody et al. |
| 8,117,686 B2 | 2/2012 | Powell et al. |
| 8,168,064 B2 | 5/2012 | Peters, Jr. et al. |
| 8,196,229 B1 | 6/2012 | Hickok |
| 8,216,453 B2 | 7/2012 | Moody et al. |
| 8,272,609 B2 * | 9/2012 | Chan .................... H01L 23/4006 |
| | | 248/245 |
| 8,343,357 B2 | 1/2013 | Horner |
| 8,388,835 B2 | 3/2013 | Haschke |
| 8,475,655 B2 | 7/2013 | Sasaki et al. |
| 8,522,408 B2 | 9/2013 | Lill |
| 8,557,109 B1 | 10/2013 | Sutherland |
| 8,608,956 B2 | 12/2013 | Moulton et al. |
| 8,652,323 B2 | 2/2014 | Dorsey |
| 8,679,328 B2 | 3/2014 | Hebert |
| 8,679,329 B2 | 3/2014 | Vreeland |
| 8,894,324 B2 | 11/2014 | Cucchiara |
| 8,906,232 B2 | 12/2014 | Mcinnis |
| 8,980,084 B2 | 3/2015 | Dorsey |
| D726,886 S | 4/2015 | Sutherland |
| 9,051,192 B2 | 6/2015 | Kent |
| 9,068,336 B2 | 6/2015 | Shaw |
| 9,107,526 B2 | 8/2015 | Rife |
| 9,127,448 B2 | 9/2015 | Thomas |
| 9,194,116 B2 | 11/2015 | Bailey et al. |
| 9,267,252 B1 | 2/2016 | Adler et al. |
| 9,322,156 B2 * | 4/2016 | McInnis ................. E03F 5/0403 |
| 9,333,642 B2 * | 5/2016 | Courtney ................. E05B 17/06 |
| 9,364,093 B2 * | 6/2016 | Williams ................. A47C 7/62 |
| 9,394,931 B2 * | 7/2016 | Jordan ................... F16B 7/0493 |
| 9,512,608 B2 | 12/2016 | Al-Assfour |
| 9,561,456 B2 * | 2/2017 | Simmons ........... B01D 46/0005 |
| 9,598,851 B2 | 3/2017 | Cadogan et al. |
| 9,605,422 B2 | 3/2017 | Shaw |
| 9,624,658 B2 | 4/2017 | Hannah et al. |
| 9,719,240 B1 | 8/2017 | Montague |
| 9,752,315 B1 | 9/2017 | Phillips |
| 9,827,521 B2 * | 11/2017 | Simmons .................. E06B 9/24 |
| 9,827,522 B2 * | 11/2017 | Simmons ............... F16B 11/006 |
| 9,919,853 B2 * | 3/2018 | Freeman ............. E05B 65/0075 |
| 9,932,157 B2 * | 4/2018 | Freeman ............. E05B 65/0075 |
| 10,040,149 B2 * | 8/2018 | Simmons ............... F24F 13/084 |
| 10,053,382 B2 | 8/2018 | Wilkie |
| 10,113,303 B2 | 10/2018 | Mardian et al. |
| 10,131,773 B2 | 11/2018 | Welle, IV |
| 10,167,620 B2 | 1/2019 | Zock et al. |
| 10,188,225 B2 * | 1/2019 | Hagglund ............... G01G 21/28 |
| 10,323,401 B2 | 6/2019 | Wilkie |
| 10,335,724 B1 | 7/2019 | Morris |
| 10,384,155 B1 | 8/2019 | Dilalla et al. |
| 10,407,891 B1 | 9/2019 | Sanguinetti |
| 10,422,119 B2 | 9/2019 | Coppola |
| 10,465,371 B2 * | 11/2019 | Wacome ............... E03F 5/0404 |
| 10,508,430 B2 * | 12/2019 | Riley ........................ E03F 5/14 |
| 10,576,400 B2 | 3/2020 | Morris |
| 10,596,501 B2 * | 3/2020 | Do ..................... B01D 46/0005 |
| 10,597,862 B1 * | 3/2020 | Downare ................. C02F 1/001 |
| 10,704,247 B2 | 7/2020 | Zock et al. |
| 10,753,077 B2 | 8/2020 | Coppola |
| 10,786,765 B2 | 9/2020 | Dilalla et al. |
| 10,864,466 B2 | 12/2020 | Morris |
| 10,870,977 B2 | 12/2020 | Meyers et al. |
| 10,934,700 B2 | 3/2021 | Meyers et al. |
| 10,995,483 B1 | 5/2021 | Sanguinetti |
| 11,098,472 B2 | 8/2021 | Zock et al. |
| 11,124,958 B1 * | 9/2021 | Gagliardi ............... E03F 5/0403 |
| 11,124,960 B1 | 9/2021 | Beaver, Jr. et al. |
| 11,168,516 B2 * | 11/2021 | van Leeuwen ......... E06B 9/522 |
| 11,346,094 B2 | 5/2022 | Lee |
| 11,459,744 B2 * | 10/2022 | Swope .................... C02F 1/001 |
| 11,473,264 B2 * | 10/2022 | Isaacson ............... E02D 29/1454 |
| 11,624,180 B1 | 4/2023 | Beaver, Jr. et al. |
| 11,648,498 B2 * | 5/2023 | Bland ................. B01D 46/0002 |
| | | 55/483 |

(56) References Cited

U.S. PATENT DOCUMENTS

| | | | |
|---|---|---|---|
| 11,877,573 B2 * | 1/2024 | Friezner | E03F 1/002 |
| 11,926,983 B2 * | 3/2024 | Isaacson | E02D 29/14 |
| 11,980,835 B2 * | 5/2024 | Zarraonandia | B01D 29/33 |
| 11,986,097 B2 * | 5/2024 | Brown | A47C 4/02 |
| 11,998,866 B2 * | 6/2024 | Simmons | B01D 46/10 |
| 2001/0023842 A1 | 9/2001 | Singleton | |
| 2002/0048490 A1 | 4/2002 | Allard et al. | |
| 2002/0096461 A1 | 7/2002 | Harris et al. | |
| 2002/0104789 A1 | 8/2002 | Harris et al. | |
| 2002/0113025 A1 | 8/2002 | Gauldin et al. | |
| 2002/0130070 A1 | 9/2002 | Roesner | |
| 2002/0130083 A1 | 9/2002 | Middleton et al. | |
| 2003/0047497 A1 | 3/2003 | Harris et al. | |
| 2003/0098267 A1 | 5/2003 | Page | |
| 2003/0136719 A1 | 7/2003 | Allard | |
| 2003/0173277 A1 | 9/2003 | Shaw et al. | |
| 2004/0011731 A1 | 1/2004 | Sanguinetti | |
| 2004/0016692 A1 | 1/2004 | Sasaki et al. | |
| 2004/0040901 A1 | 3/2004 | Page | |
| 2004/0112811 A1 | 6/2004 | Lindemulder | |
| 2004/0200767 A1 | 10/2004 | Singleton | |
| 2004/0232057 A1 | 11/2004 | Orozco et al. | |
| 2004/0237180 A1 | 12/2004 | Evans, Jr. et al. | |
| 2005/0000872 A1 | 1/2005 | Middleton et al. | |
| 2005/0067338 A1 | 3/2005 | Page | |
| 2005/0199537 A1 | 9/2005 | Kluge | |
| 2005/0247612 A1 | 11/2005 | Glassheim | |
| 2005/0262624 A1 | 12/2005 | Evans et al. | |
| 2007/0033722 A1 | 2/2007 | Evans et al. | |
| 2007/0090033 A1 | 4/2007 | Kelley et al. | |
| 2007/0295652 A1 | 12/2007 | Kent | |
| 2008/0006568 A1 | 1/2008 | Moody et al. | |
| 2008/0145150 A1 | 6/2008 | Shaw et al. | |
| 2008/0149544 A1 | 6/2008 | Shaw et al. | |
| 2008/0164221 A1 | 7/2008 | Brownstein et al. | |
| 2008/0179229 A1 | 7/2008 | Dorsey | |
| 2008/0290042 A1 | 11/2008 | Hanson et al. | |
| 2008/0296211 A1 | 12/2008 | Swan | |
| 2009/0095682 A1 | 4/2009 | Paoluccio et al. | |
| 2009/0101553 A1 | 4/2009 | Lucas | |
| 2009/0107899 A1 | 4/2009 | Ringenbach et al. | |
| 2009/0114579 A1 | 5/2009 | Dyer | |
| 2009/0173699 A1 | 7/2009 | Wacome | |
| 2009/0233737 A1 * | 9/2009 | Lerch | A63B 69/0002 473/452 |
| 2010/0108839 A1 | 5/2010 | Ringenbach et al. | |
| 2010/0133201 A1 | 6/2010 | Wacome | |
| 2010/0146881 A1 * | 6/2010 | Framer | E06B 9/02 52/202 |
| 2010/0159815 A1 | 6/2010 | Reid et al. | |
| 2011/0049027 A1 | 3/2011 | Rueda | |
| 2011/0120923 A1 | 5/2011 | Shaw et al. | |
| 2011/0219527 A1 | 9/2011 | Evans, Jr. et al. | |
| 2011/0260026 A1 * | 10/2011 | Ye | F16M 11/04 248/298.1 |
| 2011/0278237 A1 | 11/2011 | Mcinnis | |
| 2011/0290967 A1 | 12/2011 | Ringenbach et al. | |
| 2012/0043266 A1 | 2/2012 | Moody et al. | |
| 2012/0074048 A1 | 3/2012 | Glassheim | |
| 2012/0126085 A1 * | 5/2012 | Johnson | A47C 7/002 248/346.03 |
| 2013/0020242 A1 | 1/2013 | Vreeland | |
| 2013/0056399 A1 | 3/2013 | Downare | |
| 2013/0118963 A1 | 5/2013 | Bailey et al. | |
| 2013/0186811 A1 | 7/2013 | Kaiser | |
| 2013/0264256 A1 | 10/2013 | Hebert | |
| 2013/0299402 A1 | 11/2013 | Rogahn | |
| 2014/0027362 A1 | 1/2014 | Kent | |
| 2014/0048465 A1 | 2/2014 | D'Andreta et al. | |
| 2014/0124422 A1 | 5/2014 | Dorsey | |
| 2014/0197604 A1 | 7/2014 | Shaw | |
| 2014/0238915 A1 | 8/2014 | Mcinnis et al. | |
| 2015/0250315 A1 * | 9/2015 | Gross | H05K 5/0017 361/679.01 |
| 2015/0375152 A1 * | 12/2015 | Simmons | F16M 13/02 55/491 |
| 2016/0115668 A1 | 4/2016 | Halbirt | |
| 2017/0051491 A1 | 2/2017 | Wilkie | |
| 2017/0058504 A1 | 3/2017 | Wilkie | |
| 2017/0130889 A1 | 5/2017 | Honeyball | |
| 2017/0145677 A1 * | 5/2017 | Coppola | E03F 5/0404 |
| 2017/0254063 A1 | 9/2017 | Zock et al. | |
| 2017/0284077 A1 | 10/2017 | Deurloo | |
| 2017/0348624 A1 * | 12/2017 | Do | B01D 46/0005 |
| 2018/0023281 A1 * | 1/2018 | Coppola | E03F 5/0404 210/163 |
| 2018/0023282 A1 * | 1/2018 | Coppola | E03F 5/0404 210/163 |
| 2018/0112386 A1 * | 4/2018 | Coppola | E03F 5/16 |
| 2019/0040618 A1 | 2/2019 | Zock et al. | |
| 2019/0262754 A1 * | 8/2019 | Barry | B01D 46/521 |
| 2019/0358564 A1 | 11/2019 | Dilalla et al. | |
| 2021/0002886 A1 * | 1/2021 | Coppola | C02F 1/004 |
| 2022/0298773 A1 * | 9/2022 | Coppola | E03F 5/16 |
| 2023/0018046 A1 * | 1/2023 | Coppola | B01D 29/27 |
| 2024/0117622 A1 * | 4/2024 | Coppola | B01D 29/27 |

OTHER PUBLICATIONS

The Pump-It Tube, retrieved from the Internet https://ecofriendlyconstructionsupply.com on Sep. 28, 2013, 3 pages.

The Clip Guard (2013), 2 pages.

EZ-Inlet Guard; J.R. Hoe and Sons; Apr. 1, 2013; one page. (Year: 2013).

* cited by examiner

WATER INLET PROTECTION SYSTEM

CROSS REFERENCE TO RELATED APPLICATION

This application is a continuation-in-part of non-provisional application Ser. No. 17/837,281, which is a continuation of non-provisional application Ser. No. 15/359,907, filed Nov. 23, 2016, which claims priority under 35 U.S.C. § 119 to provisional application Ser. No. 62/259,985, filed Nov. 25, 2015, herein incorporated by reference in its entirety.

FIELD OF THE INVENTION

The invention relates generally to a water inlet protection system. More specifically, but not exclusively, the invention relates to a water filtration system for use with a water inlet.

BACKGROUND OF THE INVENTION

As the world continues to grow and expand, construction and the harvesting of natural resources has increased exponentially. These activities impact the environment. Specifically, some of the Earth's greatest landscapes are threatened by increased road construction, oil and gas exploration, and mining. Soil erosion, run-off, and chemicals leaching into the soil or ground water supplies are just a few of the many things that can negatively impact the environment. Because impervious surfaces (parking lots, roads, buildings, compacted soil) do not allow rain to infiltrate into the ground, more runoff is generated than in the undeveloped condition. This additional runoff can erode watercourses (streams and rivers) as well as cause flooding after the storm water collection system is overwhelmed by the additional flow. Because the water is flushed out of the watershed during the storm event, little infiltrates the soil, replenishes groundwater, or supplies stream base flow in dry weather. The negative effect of these events can be greatly increased when improper or outdated erosion and sediment control systems are put into place.

Current erosion and sediment control systems include the use of silt fencing, sand bags, and storm drain covers. Silt fences are often perimeter controls, typically used in combination with sediment basins and sediment traps, as well as erosion controls, which are designed to retain sediment in place where soil is being disturbed by construction processes. A typical fence consists of a piece of synthetic filter fabric (also called a geotextile) stretched between a series of wooden or metal fence stakes along a horizontal contour level. The stakes are installed on the downhill side of the fence, and the bottom edge of the fabric can be trenched into the soil and backfilled on the uphill side, although it is quite difficult to move the trenched "soil" from the downside to the upside of the trench. The design/placement of the silt fence should create a pooling of runoff, which then allows sedimentation to occur. Water can seep through the silt fence fabric, but the fabric often becomes "blocked off" with fine soil particles. Sediment is captured by silt fences primarily through ponding of water and settling, rather than filtration by the fabric. Sand and silt tends to clog the fabric, and then the sediments settle in the temporary pond. Silt fence fabrics (geotextiles) tested in laboratory settings have shown to be effective at trapping sediment particles. Although there have been few field tests of silt fences installed at construction sites, these tests have shown generally poor results. Other studies and articles about silt fence usage and practice document problems with installation and maintenance, implying poor performance.

Other forms of sediment control and erosion prevention include the use of sandbag barriers, fiber rolls, and storm drain inlet protection. Sandbag barriers may prevent or divert the flow of contaminated water away from a water source or storm drain, but they fail to provide a filter for removing contaminants from the water and allowing clean water to pass through. Fiber rolls are generally a temporary erosion control and sediment control device used on construction sites to protect water quality in nearby streams, rivers, lakes and seas from sediment erosion. Typically they will be made of straw, coconut fiber or similar material formed into a tubular roll. While these fiber rolls do provide a basic form of filtration, they generally provide only minimal filtration and are not reusable. Some of the disadvantages of fiber rolls are that they may be difficult to move once they become saturated with water, they should not be used on very steep land, and if the rolls are not properly staked into the ground, they may be carried away by high flows. Storm drain inlet protections typically only include a steel grate with large openings. While they prevent large items from entering a storm drain or inlet, they fail to prevent soil sediment and other contaminants from entering the drain. A sand barrier or fiber roll may be placed around a storm drain inlet to provide additional protection, but these items typically provide either extremely slow flow rates or else minimal filtration.

Therefore, there exists a need in the art for an apparatus and system that allows for improved filtration and removal of sediment and other pollutants from water, as well as providing an increased flow rate through the filtration system.

BRIEF SUMMARY OF THE INVENTION

Therefore, it is a primary object, feature, and/or advantage of the invention to improve on and/or overcome the deficiencies in the art.

It is another object, feature, and/or advantage of the invention to provide an apparatus and system that includes a frame with a plurality of tabs extending from the periphery of the frame.

It is yet another object, feature, and/or advantage of the invention to provide an apparatus and/or system for use with a storm drain or water inlet that is configured to remove sediment and other contaminants from water.

It is a further object, feature, and/or advantage of the invention to provide an apparatus with an adjustable frame and plurality of tabs extending from the frame, wherein the frame may be adjustably configured to fit multiple storm drain and inlet sizes.

It is still a further object, feature, and/or advantage of the invention to provide a system including a frame with a plurality of tabs extending from the periphery of the frame, wherein the tabs are configured to removably secure the frame via a friction fit to a grate of a storm drain.

It is still a further object, feature, and/or advantage of the invention to provide a drain inlet protection system including a frame, a plurality of tabs extending from the frame, and a filtration material removably secured to the frame. Wherein the filtration material is configured to be water permeable and to filter out sediment from the water.

It is still a further object, feature, and/or advantage of the invention to provide a drain inlet protection system including a frame with one or more corner members that are slidably interconnected to one another, said frame adjustable to fit multiple storm drain opening and/or grate sizes.

It is still a further object, feature, and/or advantage of the invention to provide a drain inlet protection system including a filtration material removably secured to a storm drain opening by one or more magnets that are attached to the filter material.

It is still a further object, feature, and/or advantage of the invention to provide a drain inlet protection system including one or more s-clip members configured to secure a filtration material within an open throat drain inlet, said one or more s-clip members securing the material within the opening via a pressed or friction fit.

It is still a further object, feature, and/or advantage of the invention to provide a drain inlet protection system.

It is still a further object, feature, and/or advantage of the invention to provide a drain inlet protection system utilizing a filtration material with a water flow rate of approximately 190 gpm/ft$^2$.

It is still a further object, feature, and/or advantage of the invention to provide a drain inlet protection system utilizing a filtration material with a water flow rate of approximately 240 gpm/ft$^2$.

It is still a further object, feature, and/or advantage of the invention to provide a drain inlet protection system utilizing a filtration material with a water flow rate between approximately 190 gpm/ft$^2$ and approximately 240 gpm/ft$^2$ and a filtering efficiency of approximately 90%.

These and/or other objects, features, and advantages of the invention will be apparent to those skilled in the art. The invention is not to be limited to or by these objects, features and advantages. No single embodiment need provide each and every object, feature, or advantage.

Figure 1:
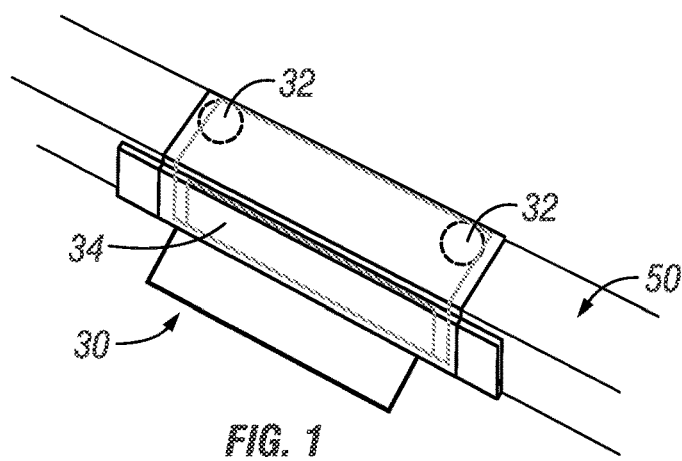
FIG. 1 is a perspective view of an example embodiment of a drain inlet protection system.

Various embodiments of the invention will be described in detail with reference to the drawings and appendices, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

Figure 11:
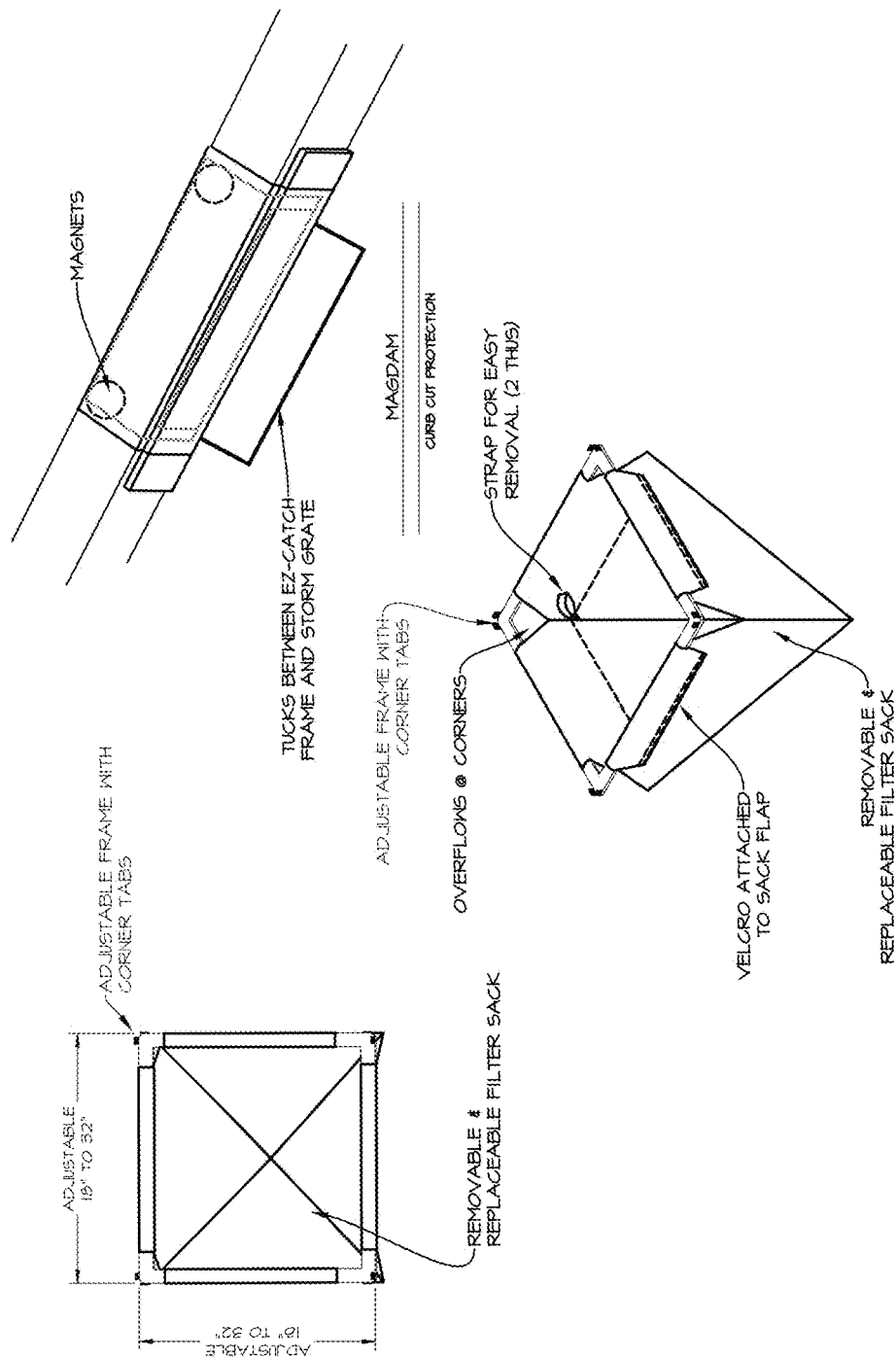
FIG. 11 is an example of a marketing piece that includes additional information on one embodiment according to at least some aspects of the present invention.

The invention is directed towards an apparatus and system for filtering water at a storm drain or water inlet. A water inlet protection system may be used to prevent unwanted sediment and other contaminants from entering a storm drain, water inlet, or the like. For example, a water inlet protection system may be inserted in a storm drain to filter water that enters the drain, the system removing unwanted sediment and contaminants. Generally a water inlet protection system may include a filter or filtering material. For example, the water protection system shown in FIG. 11 includes a filter material that is configured to trap sediment contained in water that passes through the storm drain grate and allow the filtered water to pass through into the drain.

Referring to FIG. 1, an example embodiment for an above grate water inlet protection system 30 is shown. The system 30 may be configured to fit any size, shape or configuration of above ground storm drain or water inlet. For example, the system may be configured to fit a square drain, a round drain, or a vertically oriented drain on the side of a curb. The embodiment shown in FIG. 1 includes a lower portion 33 or flap that may be tucked under the grate, wherein the grate creates a friction fit to help hold the system 30 in place. The embodiment shown in FIG. 1 may also be used in connection with the above grate systems shown in FIGS. 6A-7B (described in more detail below and shown in FIGS. 6A and 7A) and/or with the below grate systems shown in FIGS. 2A-3E (described in more detail below). The filter material 34 for the above grate system may be the same or similar to Grey Material, which will be described in more detail below. The system 30 may be removably attached to the water inlet by one or more magnets 32. The system may also include a neoprene or similar rubber-type material attached to the perimeter of the filtration material 34. The neoprene may be configured to create a seal around the perimeter of the water inlet to prevent water from entering the inlet without first passing through the material 34 to be filtered.

Figure 2A:
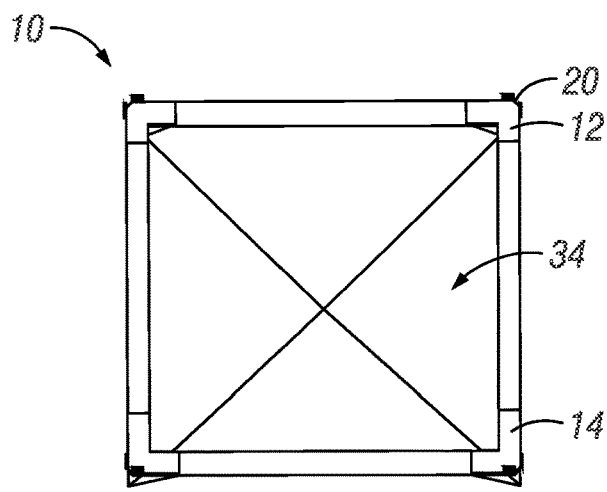
FIG. 2A is a top view of an alternative embodiment of a drain inlet protection system.
Figure 2B:
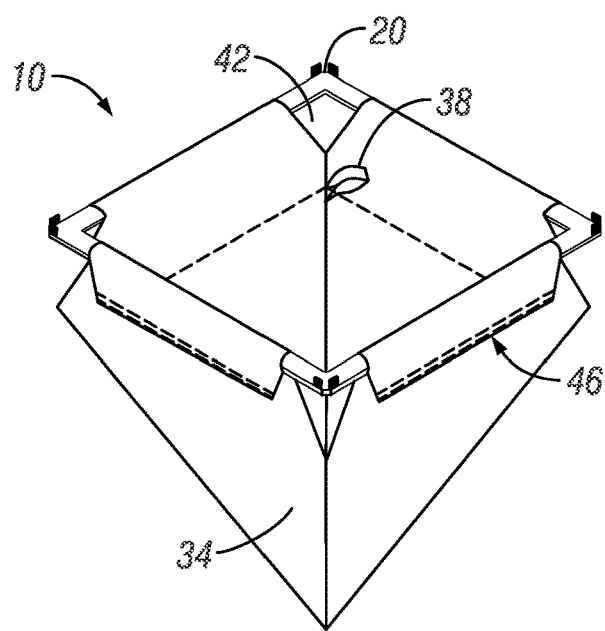
FIG. 2B is a perspective view of the drain inlet protection system of FIG. 2A.
Figure 3A:
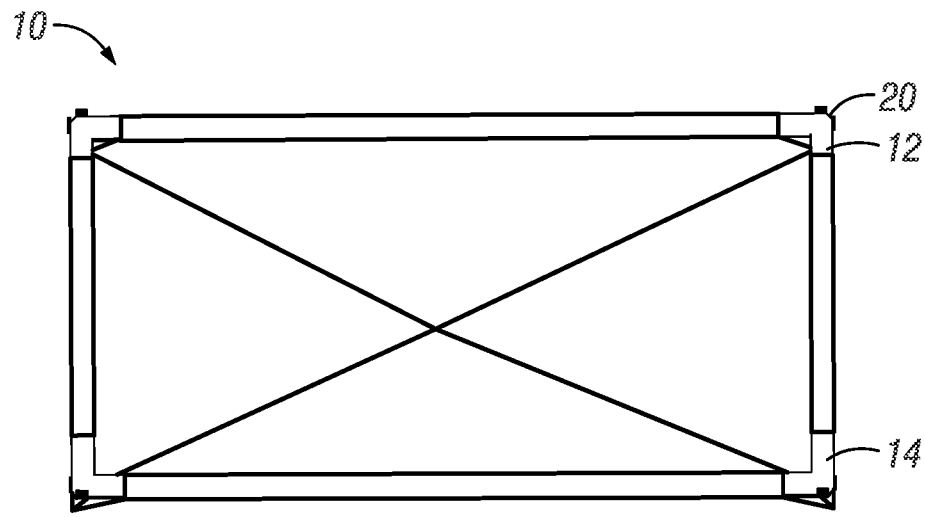
FIG. 3A is a top view of an alternative embodiment of a drain inlet protection system.
Figure 3B:
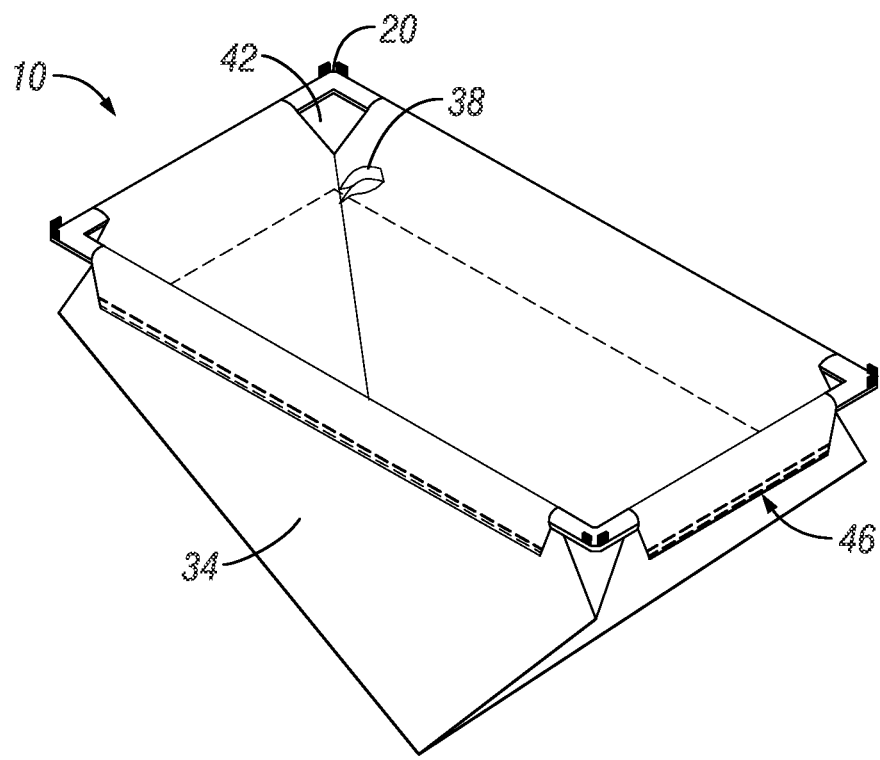
FIG. 3B is a perspective view of the drain inlet protection system of FIG. 3A.
Figure 3C:
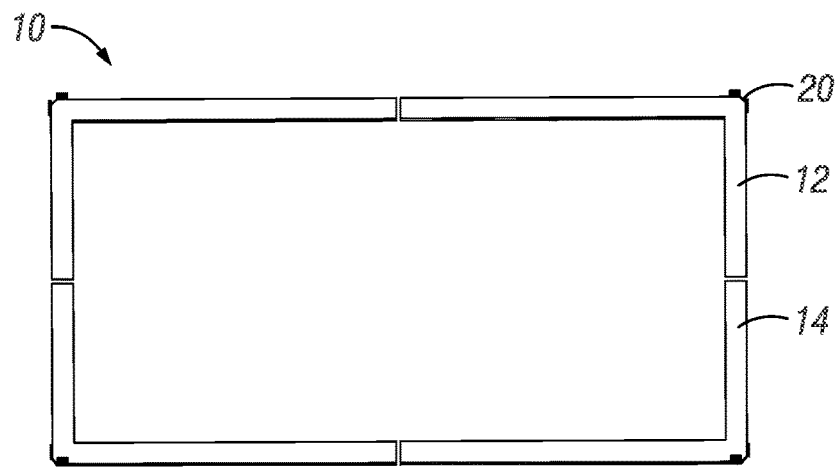
FIG. 3C is a top view of the inlet protection system frame of FIG. 3A.
Figure 3D:
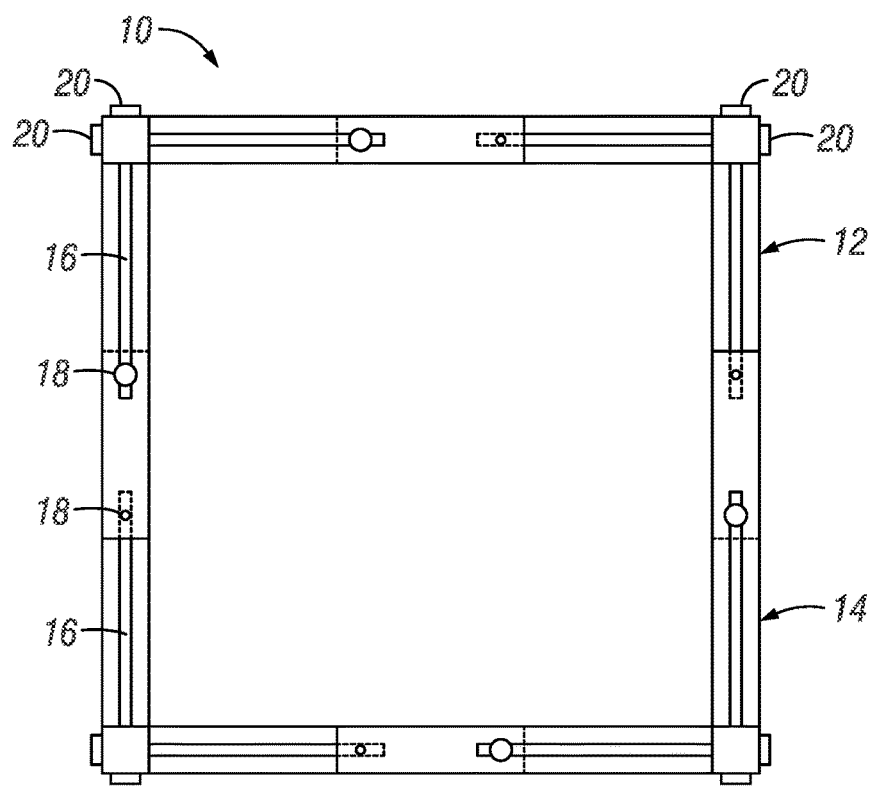
FIG. 3D is a top view of an alternative embodiment of the inlet protection system frame of FIG. 3A.
Figure 3E:
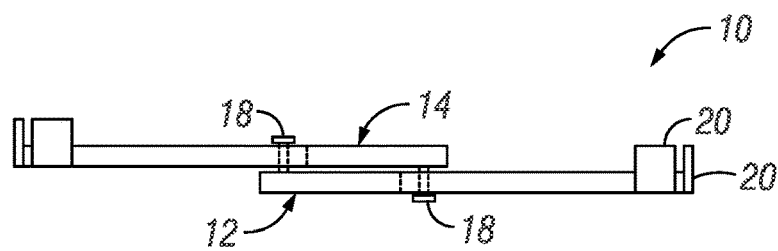
FIG. 3E is a side view of the inlet protection system frame of FIG. 3D.
Figure 4A:
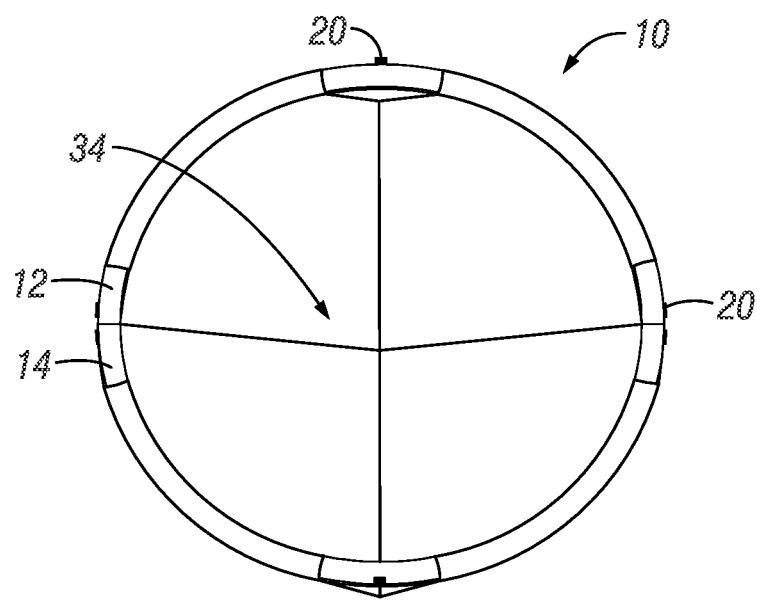
FIG. 4A is a top view of an alternative embodiment of a drain inlet protection system.
Figure 4B:
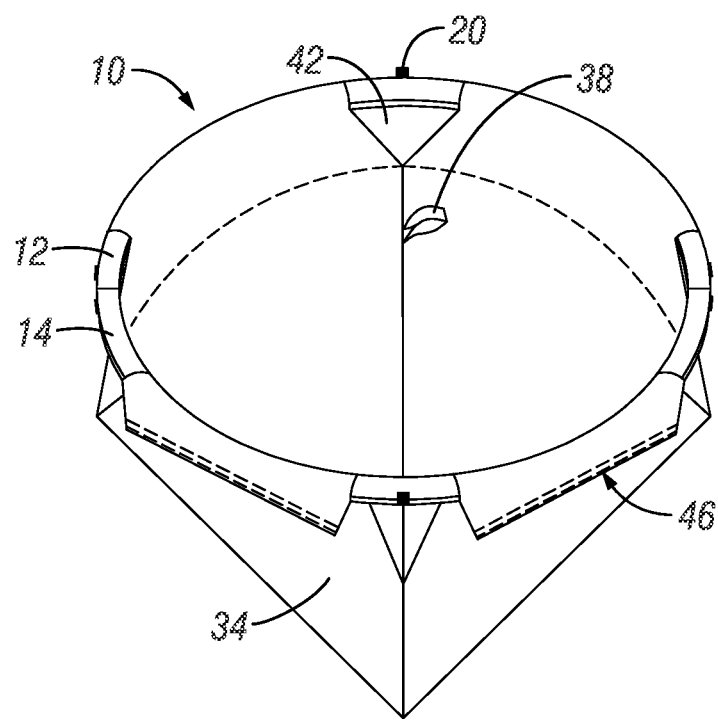
FIG. 4B is a perspective view of the drain inlet protection system of FIG. 4A.

Referring to FIGS. 2A-4B, example embodiments of a water inlet protection system that includes a frame 10 is shown. The frame 10 may be constructed of one or more corner members 12 and 14 that may be securely fastened to one another in a solid configuration. In a preferred embodiment, the frame 10 of the system may be configured to sit on the underside of the grate 44, wherein the frame 10 is pinched between the grate and the drain opening. However, it should also be understood that it is contemplated that the frame may be configured to sit and/or be attached to the top of the grate 44. The solid frame 10 configuration may be in the shape of a circle (as shown in FIG. 4A-4B), square (as shown in FIGS. 2A-2B and 3D), rectangle (as shown in FIGS. 3A-3C), or any other polygonal shape. While not shown in the figures, the corners may also be inverted or rounded to fit a specific drain opening or grate size. It is also contemplated that the corner members 12 and 14 may be adjustably connected. For example, opposing corners 12 and 14 may be slidably connected using a pin 18 and a track or slot 16. The corners 12 and 14 may also be slidably connected by a solid member (not shown), wherein each of the corner section 12 and 14 includes a pin 18 that is configured to slidably attach to tracks at opposing ends of the solid member. The pins 18 in the corner sections may be configured to slide within the track or slot of the solid member connecting the corner members. In one example embodiment, the adjustable frame 10 may configured to adjust the length and width of a square or rectangular shaped storm drain or water inlet. The frame 10 may include slidably adjustable members 12 and 14 that allow the length and width of the frame to be adjusted to correspond to the size of the drain. Furthermore, the frame 10 is configured for attachment of a filter or filter material 34. As shown in the picture included in FIGS. 2A-4B, the filter material 34 may be attached by wrapping it around a portion of the corner members 12 and 14. The filter material 34 may be secured by sewing the seam 46, attaching Velcro® along the seam 46, hooks, pins, or other similar means of securing the material 34 in place. An example filter material 34 is a High Flow Grey Material that includes the following approximate properties:

| Properties | ASTM TEST | Value |
|---|---|---|
| Mass per Unit Area (oz/yd2) | D 3776 | 5.2 |
| Grab Tensile Strength, MD × CD (lbs) | D 4632 | 297 × 223 |
| Grab Elongation, MD × CD (%) | D 4632 | 58/59 |
| Trapezoid Tear, MD × CD (lbs) | D 4533 | 81 × 75 |
| Puncture (lbs) | D 4833 | 99 |
| Burst Strength (psi) | D 3786 | 340 |
| Permittivity (sec-1) | D 4491 | 2.60 |
| A.O.S. (U.S. sieve - (mm) | D 4751 | 60 |
| Water Flow Rate (gpm/ft2) | D 4491 | 192 |
| Filtering Efficiency (%) | D 5141 | 91.6 |

While the High Flow Grey is given as an example above, any suitable filter or filtering material 34 may be used. An example of an advantage provided by the referenced material, is that the material is reusable. The High Flow Grey Material may be removed from the storm drain, the sediment captured in the material may be removed from the material and disposed in a proper manner, and the material may be reinstalled in the drain. The material 34 may be rinsed and reused multiple times without compromising the filtering properties or flow properties. Also shown in the image included in FIGS. 2B, 3B, and 4B, it can be seen that at the corners of the frame 10, there may be openings or cut-outs 42 in the filter material 34. These openings 42 are intended to provide overflow protection in the event the filter material 34 becomes plugged or clogged to the point water is unable to pass through the material 34. If this occurs, the water may still be able to pass through the openings 42 in the corners to prevent water from backing up or flooding over into other areas because the drain is blocked. The frame 10 and/or material 34 may also include a loop or handle 38 for lifting and/or removing the system 10 from a storm drain/water inlet.

Referring to FIG. 3D, a top view of the adjustable frame 10 is shown. While FIGS. 2A-2B and 3D depict the frame 10 in a generally square configuration, it should be understood that other sizes and shapes are considered. For example, the frame 10 may be adjusted to be in the shape of a rectangle (FIGS. 3A-3C), or additional slidably adjustable sides may be added to create a pentagon, hexagon, or similar shapes that may be utilized to fit a round shaped storm drain or sewer opening. Each side of the frame includes a top member 14 and an opposing bottom member 12. The top and bottom members 14 and 12 are slidably connected by one or more pins 18 or similar means of slidable or telescoping attachment or connection. For example, the top member 14 may include a fixed pin 18 extending downward through a slot or track 16 cut in the bottom member 12. Conversely, the bottom member 12 may include a fixed pin 18 extending upward through a slot or track 16 in the top member 14. The pins 18 and tracks or slots 16 are configured to allow the top and bottom members 14 and 12 to slide relative to one another, shortening or lengthening that side of the frame 10. All sides of the frame 10 may be configured in a similar manner to allow the length of each side to be adjustable. It is also contemplated that the corners may be attached by a connection member that allows for slidable adjustment of the size and length of the frame 10. The connection may be attached to the top or bottom of both opposing corner members 12 and 14, or the connection member may connect to the top of one member 12 and the bottom of the opposing member 14, or vice versa. The connection may be flat or may include one or more bends to achieve the required fit and/or adjustment. It is also contemplated that the adjustable frame may incorporate a telescoping mechanism to provide adjustment of the frame.

Referring to FIG. 3E, a side view of one side of the frame is shown. It can be seen how the top and bottom members 14 and 12 may be oriented relative to one another. Also shown are how the pins 18 extend from the top member 14 down through the bottom member 12 and vice versa. Furthermore, as shown in FIGS. 2A-4B, located in the corners of the frame 10 are tabs 20 that extend vertically from the frame. These tabs 20 are configured to hold the frame 10 in place when positioned in a storm drain or water inlet. For example, the frame 10 may be placed in a storm drain with a filter material 34 attached. The frame 10 may be extended to fit the size of the drain. Once the frame 10 has been extended to fit the drain, the grate 44 may be placed on top of the frame 10. The tabs 20 may be configured to be outside the outer edge of the frame of the storm grate, therefore preventing the adjustable frame 10 from being pulled inward when a weight or force is applied to the filter material 34 by fluid or material trying to pass through the drain. The tabs 20 may create a friction fit with the grate to hold the system 10 in place. While the frame has been described as adjustable, it is contemplated that a solid frame may also utilize the tabs 20 for positioning, orienting, or holding in place the frame relative to a storm drain grate or sewer cover.

Figure 5A:
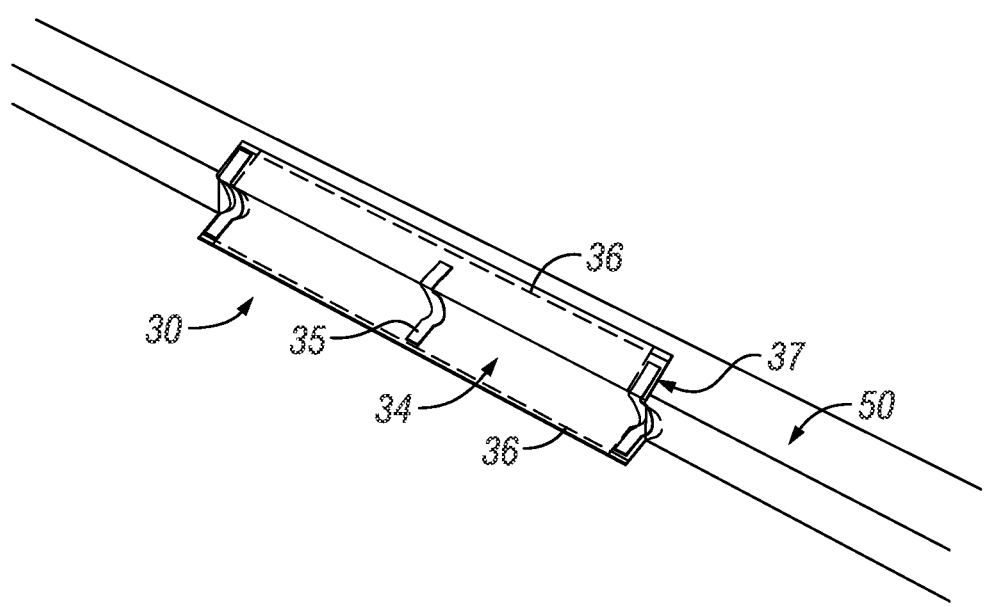
FIG. 5A is a perspective view of an example embodiment of a drain inlet protection system.
Figure 5B:
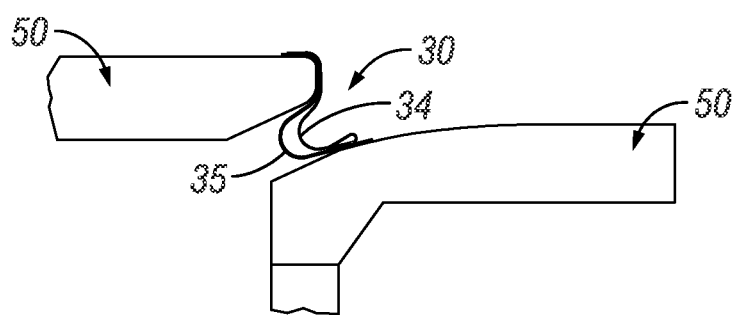
FIG. 5B is a side view of the inlet protection system of FIG. 5A.

Referring to FIGS. 5A-5B, an example embodiment of a water inlet protection system 30 for use with an open throat inlet along a curb 50, or similar. This embodiment includes an s-shaped clip member 35 that may be sewn into the filtering material 34. The s-clips 35 may be located at the ends or edges 37 of the inlet system 30, but additional s-clips 35 may be located along the width of the system to provide additional support if needed. The s-clips 35 generally may be constructed of a flexible material, such as a metal alloy or plastic polymer. The clips 35 should provide necessary strength and flexibility properties to be wedged into the open throat inlet opening along a curb 50 to create a pressed or friction fit with the inlet opening of the curb 50, as shown in the side view of FIG. 5B. This embodiment of the protection system 30 may include a neoprene strip 36 along the horizontally oriented edges to provide a seal to the curb or drain surface when the neoprene is wet. S-clips 35 may be attached to the filtration material 34 by sliding the clips 35 in between seams in the fabric or other similar means of removable attachment may be utilized. The edges of the material 34 may be configured to butt up end to end to attach additional open throat protection systems 30 together if a wider system is needed for a particular drain or inlet. The Velcro™ may also be configured for attaching a solid member that may be configured to directing the flow of the water through the filter material.

Figure 6A:
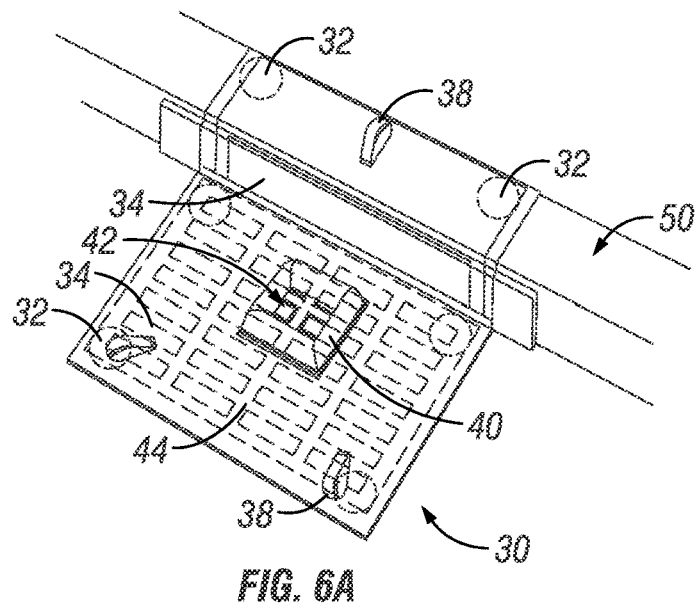
FIG. 6A is a perspective view of an alternative embodiment of a drain inlet protection system including overflow protection.
Figure 6B:
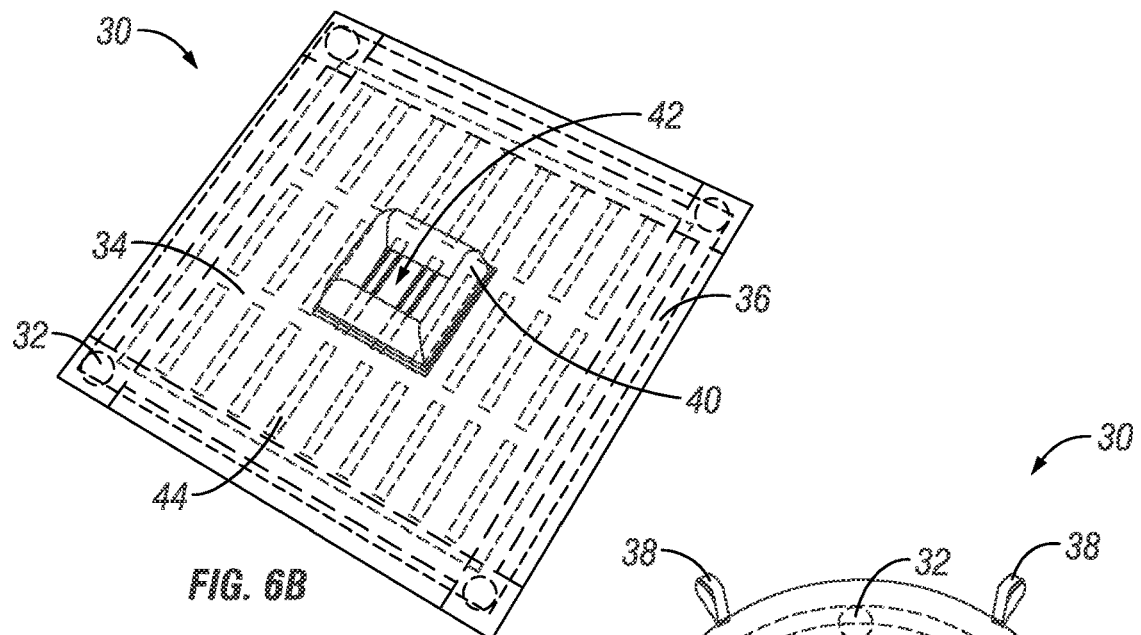
FIG. 6B is a perspective view of an alternative embodiment of a drain inlet protection system including overflow protection.
Figure 6C:
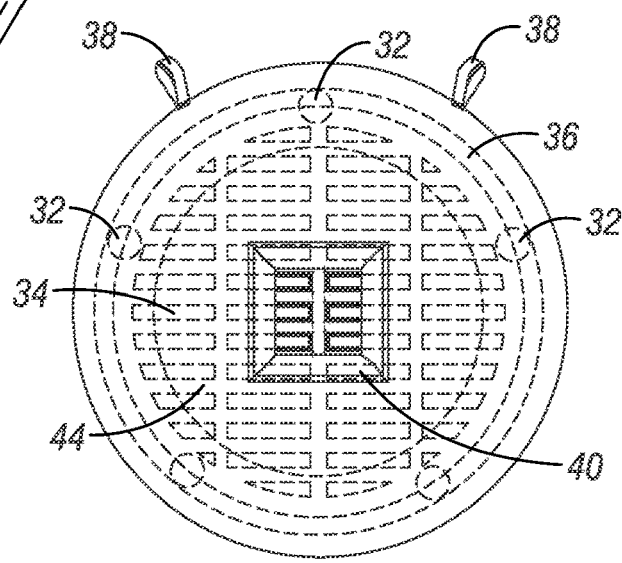
FIG. 6C is a top view of an alternative embodiment of a drain inlet protection system including overflow protection.

Referring to FIGS. 6A-6C, three example embodiments of an above grate system 30 are shown. Common components that may be included in all three embodiments include a handle or pull strap 38, magnets 32, and a neoprene strip 36. The handle or pull strap 38 may be used for lifting or removing the system 30 from a storm drain or water inlet. The magnets 32 may be sewn into or similarly attached to the filter material 34 and configured/positioned to magnetically/removably attach the system 30 to a steel grate 44 or inlet of a storm drain or similar water inlet. For example, in the square shaped embodiment, as shown in FIG. 6B, the magnets 32 may be located at the corners so as to magnetically attach the system 30 to the corner of square grate 44 of a storm drain. Generally the magnets 32 may be positioned anywhere within the confines of the protection system, but typically will be located proximate to the corners or edges so as to create a seal at the outer edge so that storm water may not enter the drain without first passing through the filter material 34. The magnets 32 also serve to hold the system 30 in place, such that it does not blow away or get swept away by flowing water. The magnets 32 may also be placed on top of the fabric. Similarly, a neoprene strip(s) 36 may be included or sewn into the outer edge of the material 34 of the system 30 and configured to create a seal at the outer edge to prevent water from entering the drain 44 without first passing through the filter material 34. The neoprene 36 may be configured, such that when wet, it will increase in weight and create a seal with the grate 44 of the drain or the structure surrounding the drain.

FIG. 6A shows an example embodiment of the system 30 for use with a vertical water inlet on the side of a curb may also include a solid core, such as a polyethylene member, that is designed to give the system 30 structure and rigidity along the back edge along vertical inlet portion of the curb 50. The solid core may also serve to prevent the flow of water through the vertical portion of the inlet, which typically may not include any type of grate or screening, while directing the water to pass through the filter material 34 located on top of the horizontal portion of the drain/grate 44.

Figure 7A:
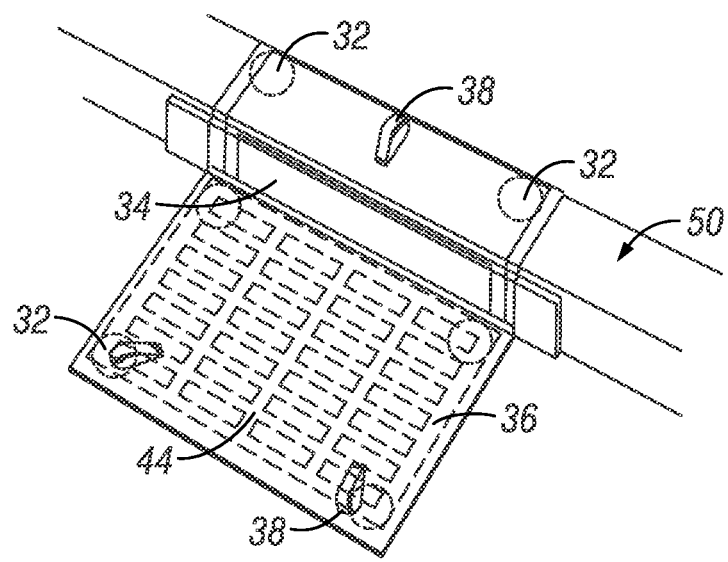
FIG. 7A is a perspective view of an alternative embodiment of a drain inlet protection system.
Figure 7B:
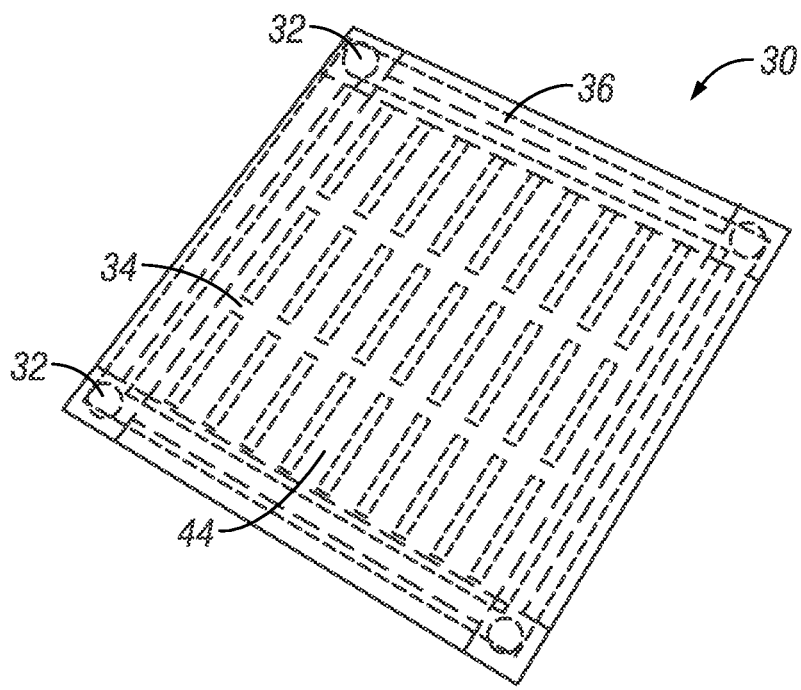
FIG. 7B is a perspective view of an alternative embodiment of a drain inlet protection system.
Figure 8A:
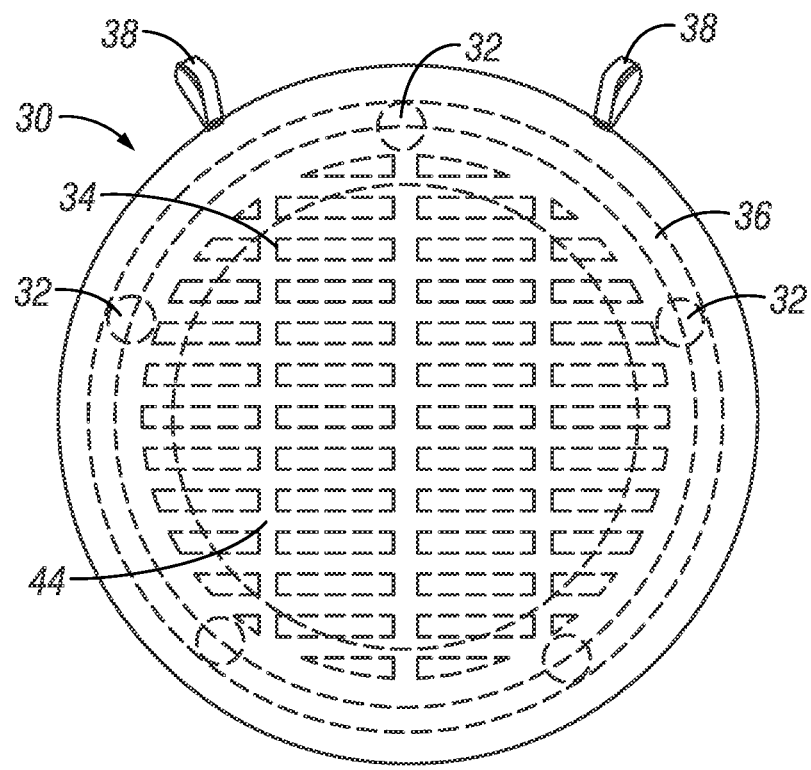
FIG. 8A is a top view of an alternative embodiment of a drain inlet protection system.
Figure 8B:
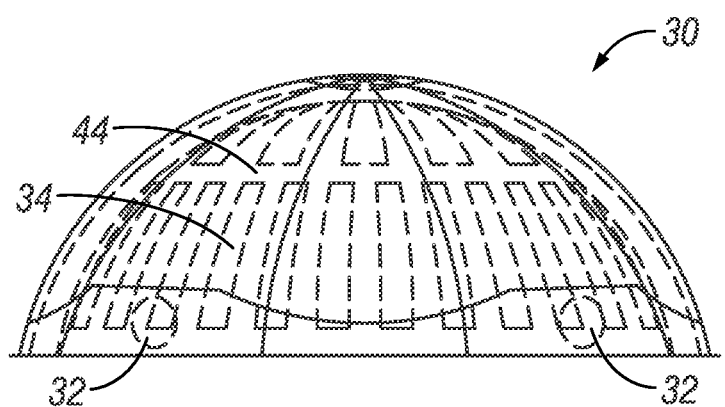
FIG. 8B is a side view of the drain inlet protection system of FIG. 8A.

Referring to FIGS. 6A-8B, examples of the square and circular embodiments of the above grate protection system 30 are shown. In FIGS. 6B and 7B, the square system 30 is shown, include one or more handles 38, magnets 32, neoprene strips 36, and the filter material 34. Similarly, FIGS. 6C and 8A-8B show examples of round embodiments including one or more handles 38, magnets 32, neoprene strips 36, and the filter material 34. FIGS. 6A-6C show example embodiments of the system 30 including an overflow protection member 40 surrounding a cut-out portion 42 of the filtering material 34. The overflow protection member 40 may be included in any or all embodiments of the water inlet protection system 30. The overflow protection barrier shown in FIG. 6A-6C may include an elevated ring or square member 40 with a hole in the center 42 that allows water to pass directly through to the drain 44. The overflow protection member 40 is intended to provide overflow protection in the event the filter material 34 becomes plugged or clogged to the point water is unable to pass through the material 34. If this occurs, the water may still be able to pass through the openings 42 in the center to prevent water from backing up or flooding over into other areas because the material 34 over the drain 44 is blocked.

As shown in FIG. 6A-6C, the overflow protection barrier may be elevated above the filter material 34 to facilitate or encourage water to pass through the filter material 34 as opposed to entering the drain 44 through the hole 42 in the center of the overflow barrier 40. The height of the overflow barrier 40 may be configured based on the specific needs at a particular drain site. For example, if a standing water level exceeding three inches (3") would be damaging or hazardous to the surrounding area, the protection member 40 may be configured to have a height of two inches to prevent standing water from ever reaching a height of three inches (3"). However, if it is more important that all water entering a particular drain pass through the filter material 34, the height of the protection member 40 may be increased.

FIGS. 7A-8B show alternative embodiments of a drain inlet protection system that may be attached to the top of the grate of a storm drain or similar water inlet. The embodiments shown in FIG. 7A-8B do not include the water over flow barrier or cut-out.

Figure 9A:
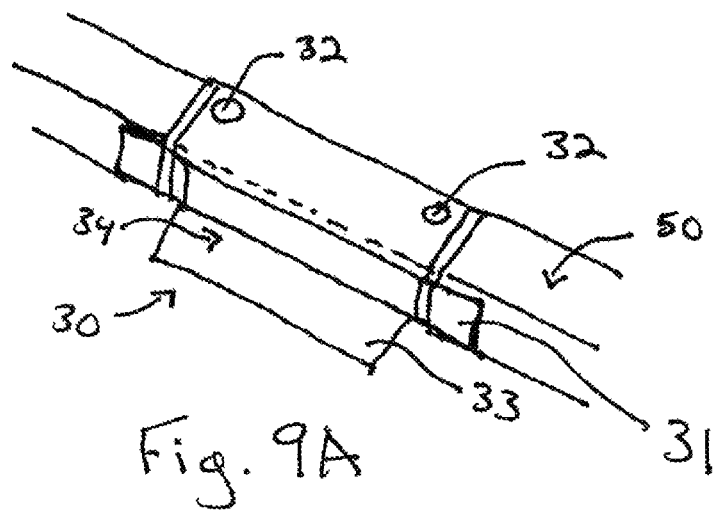
FIG. 9A is a perspective view of a drain inlet protection system of FIG. 1 including a drain inlet back-stop.
Figure 9B:
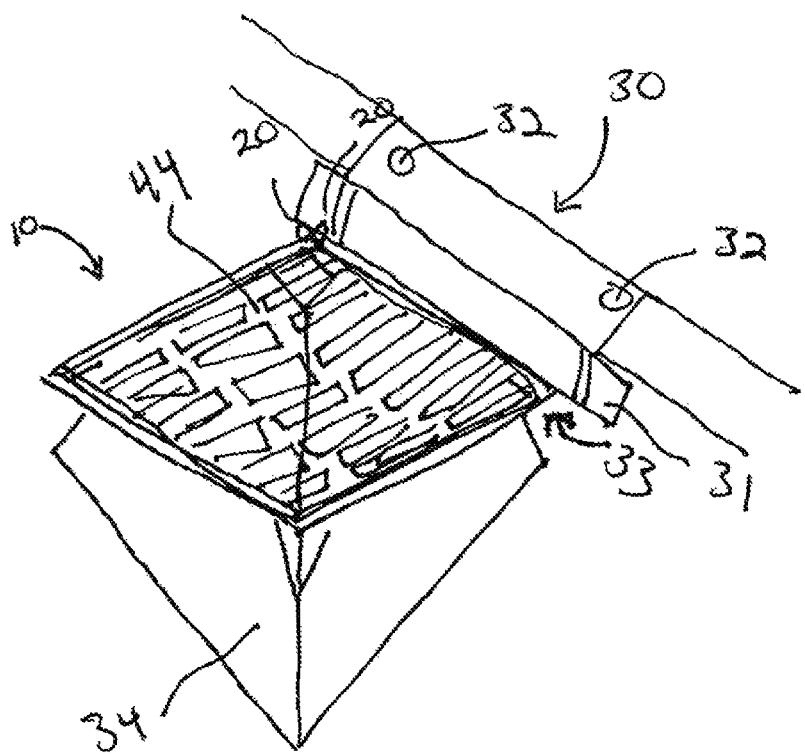
FIG. 9B is a perspective view of the drain inlet back-stop of FIG. 9A in combination with the alternative embodiment of a drain inlet protection system of FIG. 2.

Referring to FIG. 9A, an alternative embodiment of the system 30 represented in FIG. 1 is shown. FIG. 9A shows an inlet protection system including a back-stop 31 that is not permeable. The system 30 shown in FIG. 9A may be configured to have a non-permeable backstop to direct the flow of water elsewhere, and prevent water from entering an opening on the vertical portion of a curb 50. The embodiment shown in FIG. 9A may be utilized in combination with the other inlet protection systems 10 and/or 30 described above. For example, the system 30 of claim 9A may be used in connection with the below-grate inlet protection system 10 shown in FIGS. 2-3, wherein the lower portion of 33 of system 10 may be inserted underneath the grate 44 that the below-grate frame 12 and 14 of the inlet protection system 30 is attached to. In this example, the back-stop 31 will prevent water from flowing in the vertical inlet/opening on the curb 50, and will re-direct the water to flow down the grate 44, wherein the water will be filtered through the filter material 34 attached to the frame 12 and 14. The back-stop 31 may also be used in connection with the above-grate systems shown in FIGS. 6 and 7, as depicted in FIGS. 6A and 7A.

Figure 10:
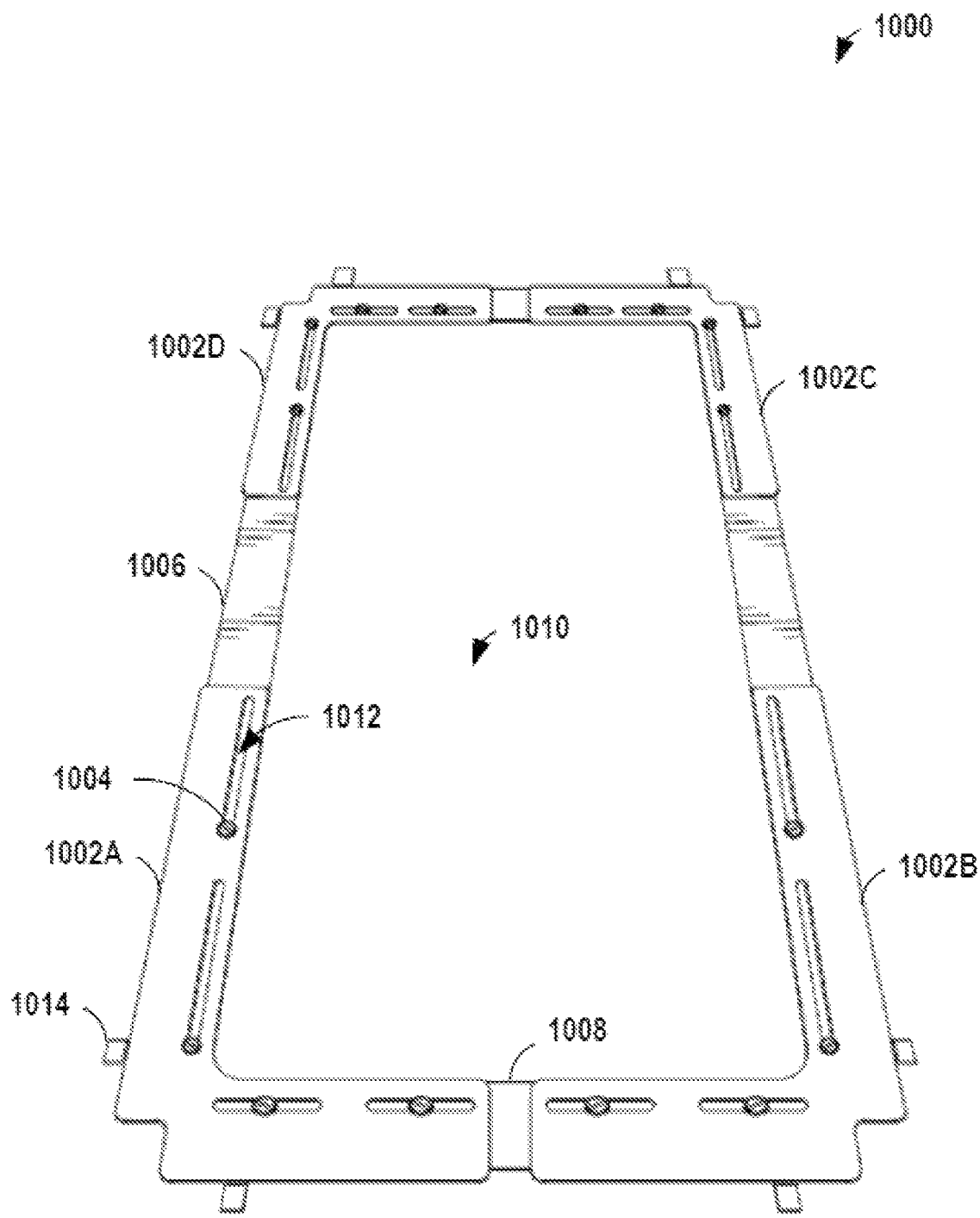
FIG. 10 is a perspective view of an example embodiment of a drain inlet protection system.

Referring to FIG. 10, an alternative embodiment of system 10 represented in FIGS. 2A-4B is shown. The drain inlet protection system of FIG. 10 includes adjustable frame 1000 defining interior cavity 1010. Adjustable frame 1010 includes rigid base members, including rigid base members 1006 and 1008. As shown in FIG. 10, adjustable frame 1010 may also include rigid base members directly opposite rigid base members 1006 and 1008, forming a rectangular frame. In other instances, a different number of rigid base members may be present in adjustable frame 1000 to form alternate shapes, such as pentagons, hexagons, or octagons, among other shapes. Adjustable frame 1000 may be made from any suitable material, including, but not limited to, steel, aluminum, plastic, fiberglass, another metal or alloy, or any other material durable and rigid enough to suitably receive water and filter sediments from that water.

In the example of FIG. 10, adjustable frame 1000 includes slidable corner members 1002A, 1002B, 1002C, and 1002D (collectively, "slidable corner members 1002"). In some instances, each of slidable corner members 1002 includes a cutout on an exterior corner portion of the respective slidable corner member such that adjustable frame 1000 may fit better when in use, such as on top of a grate that extends into a sidewalk or curb. In the example of FIG. 10, each of slidable corner members 1002 includes slots 1012. In other examples, only one or more of slidable corner members 1002 may include slots 1012, with one or more other slidable corner members being fixed to the rigid base members (e.g., slidable corner member 1002A may be fixed to rigid base member 1006 and rigid base member 1008, while slidable corner members 1002B-1002D may include slots 1012 and slide relative to slidable corner member 1002A).

Adjustable frame 1000 may be sized such that a width of the members 1002, 1006, and 1008 are wide enough to provide stability to adjustable frame with a minimal depth profile. For instance, by having members 1002, 1006, and 1008 be made of a durable material and having a certain width (e.g., greater than a half inch, greater than an inch, greater than two inches, or any other width to provide adequate rigidity to adjustable frame 1000), a depth of the various members 1002, 1006, and 1008 may be reduced (e.g., less than one quarter of an inch, less than one eighth of an inch, less than one sixteenth of an inch, less than one thirty-second of an inch, or any other depth to provide the described benefit) such that the combination of adjustable frame 1000 and a grate, when sitting atop adjustable frame 1000 or beneath adjustable frame 1000, protrudes a minimum amount as compared to a grate by itself, while still maintaining the durability due to the width of members 1002, 1006, and 1008 and the durable material that makes up adjustable frame 1000.

Adjustable frame 1000 further includes multiple nut-and-bolt fasteners 1004. Each nut-and-bolt fastener 1004 includes a nut portion and a bolt portion. The bolt portion of nut-and-bolt fasteners 1004 may extend through one of slots 1012 and a hole in one of the rigid base members. The nut portion of nut-and-bolt fasteners 1004 may receive the bolt on the opposite side of the rigid base member. The nut portion may either be fixed (e.g., soldered) to an underside of the rigid base member (e.g., such that an operator only has to tighten or loosen the bolt portion to adjust or fix adjustable frame 1000) or may be separate from the rigid base member (e.g., such that the operator may operate both the nut and the bolt portion to adjust or fix adjustable frame 1000).

Each of nut-and-bolt fasteners 1004 secures the nut-and-bolt fastener to the respective slidable corner member and the respective rigid base member. When the respective bolt for nut-and-bolt fastener 1004 is loosened, along with any other nut-and-bolt fasteners for slidable corner member 1002A, slidable corner member 1002A becomes slidable along the respective slot 1012 atop the respective rigid base members 1006 and 1008, thereby altering a boundary of interior cavity 1010. Conversely, when the respective bolt for nut-and-bolt fastener 1004 is tightened, along with any other nut-and-bolt fasteners for slidable corner member 1002A, slidable corner member 1002A becomes fixed in place atop the respective rigid base members 1006 and 1008, thereby fixing the boundary of interior cavity 1010.

In other words, the function of nut-and-bolt fasteners is to attach slidable corner members 1002 to the various rigid base members (e.g., 1006 and 1008), while being able to be loosened such that the slidable corner members 1002 may slide with respect to one another to either expand and increase a size of interior cavity 1010 or decrease a size of interior cavity 1010. In practice, adjustable frame 1000 may be placed over top a grate that receives water mixed with various sediments. However, grates are not typically universal in size. By providing an adjustable frame as described in FIG. 10, adjustable frame 1000 may, in some instances, nearly double a size of each dimension of interior cavity, greatly varying the number of different grates that adjustable frame 1000 can attach to (e.g., between ~11"×21" to ~22× 42", ~12"×12" to ~24"×24", ~12"×24" to ~24"×48", ~24"× 24" to ~48"×48", or any other size dimensions to reasonable cover grates as described herein). In other examples, such as the instance of FIG. 10, the grates may be expandable in an amount less than doubling the dimensions of adjustable frame, such as by increasing the dimensions by up to 25%, 50%, 75% or some other percentage less than 100%. This also enables adjustable frame 1000 to be re-usable across a number of projects with different sized grates, reducing waste produced from these frames.

While it is possible for each slidable corner to move by itself, due to the angles of adjustable frame 1000, slidable corner members may slide in pairs relative to other slidable corner members. As an example, slidable corner member 1002A is slidably attached to each of a first end of rigid base member 1006 and a first end of rigid base member 1008. Meanwhile, slidable corner member 1002D is slidably attached to a second end of rigid base member 1006, and slidable corner member 1002B is slidably attached to a second end of rigid base member 1008. When slidable corner member 1002A slides along the rigid base member 1006, each of slidable corner member 1002A, rigid base member 1008, and slidable corner member 1002B may move together relative to slidable corner member 1002D. Similarly, when slidable corner member 1002A slides along rigid base member 1008, slidable corner member 1002A, rigid base member 1006, and slidable corner member 1002D may move together relative to slidable corner member 1002B.

In some instances, adjustable frame 1000 further includes one or more tabs 1014 extending from one of more of slidable corner members 1002. Each of tabs 1014 may be foldable along a perforated connection between the respective tab 1014 and adjustable frame 1000 at slidable corner members 1002. When folded along the perforated connection, tabs 1014 may secure adjustable frame 1000 in place with respect to a grate. For instance, a grate may be removed from a sewer system, and adjustable frame 1000 may ultimately be placed in the space where the grate would typically sit. Tabs 1014 may be folded upwards either prior to adjusting adjustable frame 1000 or after adjustable frame 1000 is correctly sized. Adjustable frame 1000 may be placed in the space where the grate would sit, and the grate may be replaced to sit atop adjustable frame 1000. Tabs 1014, being folded up, may receive the grate such that the grate is aligned with adjustable frame 1000 to maximize the flow through the grate and interior cavity 1010 of adjustable frame 1000.

In some instances, a water permeable filtration material, as described above or made of any water permeable material including paper, ceramic, polypropylene, acrylic fiber, glass fiber, polyester, spun cellulose, and rayon among other things, may be attached to adjustable frame 1000 and covering interior cavity 1010, either tight across or by forming a hollow or open-topped three-dimensional shape beneath interior cavity 1010. In this way, any water that may flow over adjustable frame 1000 may be able to pass through the water permeable filtration material, such as into a drainage or sewer system, while the water permeable filtration material may collect sediments or other undesirable waste that is mixed in with the water. The water permeable filtration material may be altered to increase strength or filtration efficacy, such as by double-seaming the material, adding a built-in scrim to the material, or including multiple layers of the material. The water permeable filtration material further comprises a cut-out section proximate to at least one of slidable corner members 1002 such that the water permeable filtration material can allow the cut-out corners of slidable corner members 1002 to remain open to create a snug fit against a sidewalk, curb, or other raised surface around the grate. Otherwise, at least a portion of the water permeable filtration material may be wrapped about adjustable frame 1000, enabling the water permeable filtration material to be replaceable.

In some instances, slidable corner members 1002 may be universal across different size frames. For instance, a size of rigid base members 1006 and/or 1008 may change to fit larger or smaller grates, but all sizes of rigid base members (potentially with a same size of nut soldered to an underside of the member) may be configured to fit a same size of slidable corner members 1002, allowing slidable corner members 1002 to be universal and mass produced without taking into account a size of a rigid base member that will be paired with slidable corner members 1002.

While not shown in the figures, it should be understood that alternative forms of water filtration and inlet protection systems have been contemplated. For example, the filtering material described above may be utilized to construct a dewatering bag to filter sediment out of water pumped through the bag prior to entering a drain or other water system. The dewatering bag may be made or constructed of a filter material similar to the material described above. Furthermore, the dewatering bag may be configured to be used in conjunction with a hose or pump. In preferred embodiment that dewater bag may be attached to a hose that is connected to the outlet of a pump. For example, the dewatering bag may include an opening or inlet that may be configured for attaching a hose to the dewatering bag. The bag may then be placed near or proximate to a drain or water inlet, and as the pump transfers water to the dewatering bag, the water will pass through the filter material, leaving sediment and other contaminants trapped in the dewatering bag. Furthermore, chemicals and/or other filtering elements may be inserted in the dewatering bag to aid with the removal or reduction of harmful chemicals, such as nitrates, from the water.

The dewatering bags may come in many shapes and sizes. For example, a short and wide shaped configuration may be utilized for a dewatering bag. Alternatively, the dewatering bag may be long and narrow. The size and shape of the dewatering bag may be configured based on the size of the drain or water inlet. The size of the dewatering bag may also be configured based on the size of the pump and/or the amount of fluid pumped It may also be configured based on pump size and/or the size of the hose utilized to pump water into the dewatering bag. A strap may be utilized to removably secure the dewatering bag to a hose or pump. For example, a strap that includes a D-ring clip for fastening the strap may be used to removably secure the dewatering bag to a pump outlet.

This embodiment of the protection system will generally come in a predetermined length, for example ten feet (10') lengths. The ends of the protection system may include Velcro™, D-rings and a strap, or similar means of connection that are configured for attaching multiple lengths of the protection system together. A strap may also be used for attaching multiple lengths of the protection system together. The protection system may be configured to include handles that can be used in moving or placing the protection system.

It is also contemplated that the water inlet protection system may include filter material (as described above) attached to a plurality of wood or metal stakes or similar. The stakes may be utilized to orient the filter material in a vertical position. Furthermore, the stake can hold the filter material in place and attach the filter material to the ground and provide a boundary for filtering out sediment from water. The filter material may have a height of approximately 39.5 inches.

Another embodiment of a water inlet protection system may also be configured for use in the concrete or construction industry. For example, the water inlet protection system may be configured to separate the sediment and materials included in concrete from the water. When cleaning tools or rinsing out containers utilized in pouring concrete, any leftover or reaming concrete must be properly disposed of and should not be rinsed down a drain. The water inlet protection system may include a base and frame for attaching a filtering material to. The base and frame may be configured in a square, rectangular or generally round shape, but may be constructed in any shape that includes an opening at the top. The concrete may be rinsed into the filter material and water applied. Chemicals should also be added to aid the removal or reduction of PH levels and/or contaminants. For example, Bio-flucculant and PLO-flocculant-enables filtering of fines. PH Stabilizer may also be added to relegate PH when needed. For use with concrete, an additional geotextile fabric is required to slow the filtration process and allow the chemicals to mix/interact with the concrete and water mixture. The filter material may be configured to remove the concrete material and other sediment, while allowing the water to pass through the material. The water passing through the filter material may then pass safely through the drain or water inlet without introducing the sediment and contaminants included in concrete. Filtering out the water from the concrete also allows the concrete material to dry faster and be properly disposed of once captured by the filter material.

While many embodiments of the filter material 34 to be used with the water inlet protection systems described above are contemplated, two example embodiments of the material are described in greater detail below. One example embodiment of filter material with the following properties and/or characteristics:

| Properties | ASTM TEST | Value |
| --- | --- | --- |
| Mass per Unit Area (oz/yd2) | D 3776 | 5.2 |
| Grab Tensile Strength, MD × CD (lbs) | D 4632 | 297 × 223 |
| Grab Elongation, MD × CD (%) | D 4632 | 58/59 |
| Trapezoid Tear, MD × CD (lbs) | D 4533 | 81 × 75 |
| Puncture (lbs) | D 4833 | 99 |
| Burst Strength (psi) | D 3786 | 340 |
| Permittivity (sec-1) | D 4491 | 2.60 |
| A.O.S. (U.S. sieve - (mm) | D 4751 | 60 |
| Water Flow Rate (gpm/ft2) | D 4491 | 192 |
| Filtering Efficiency (%) | D 5141 | 91.6 |

An alternative embodiment of the filter material may include a filter material with the following properties and/or characteristics:

| Properties | ASTM TEST | Value |
| --- | --- | --- |
| Mass per Unit Area (oz/yd2) | ISO 9073-1 | 3.84 |
| Breaking Strength, MD (lbs/2in) | ISO 9073-3 | 102.4 |
| Breaking Strength, CMD (lbs/2in) | ISO 9073-3 | 87.9 |
| Elongation to break, MD (%) | ISO 9073-3 | 32.8 |
| Elongation to break, CMD (%) | ISO 9073-3 | 34.7 |
| Water Flow Rate (gpm/ft2) | Mfg Testing | 240 |

It is also contemplated that a filtering material 34 may be utilized that includes a flow rate somewhere in between the two materials referenced above.

A water inlet protection system including a filter material capable of removing sediment and other water contaminants, while allowing for an improved flow of water has thus been described. The present invention contemplates numerous variations, options and alternatives, and is not to be limited to the specific embodiments described herein. For example, any of the alternative embodiments described above may be modified or used in combination with one or more of the other embodiments. Other changes are considered to be part of the present invention.

What is claimed is:

1. A storm drain inlet protection system, said system comprising:
    an adjustable rectangular frame (1000) defining an interior cavity (1010), the adjustable rectangular frame comprising:
        four rigid elongate base members (1006, 1008) for positioning in the shape of rectangle about a drain inlet;
        four slidable L-shaped corner members (1002A, 1002B, 1002C & 1002D), each section of the L-shape having an elongate slot (1012);
    at least four nut-and-bolt fasteners (1004);
    a water permeable filtration material for attachment to the adjustable rectangular frame (1000), covering the interior cavity (1010) when attached;
    wherein, the four slidable L-shaped corner members (1002A, 1002B, 1002C & 1002D), are placed atop the four rigid elongate base members (1006, 1008) formed in the shape of a rectangle about a drain inlet, and the L-shaped corner members are slidably positioned and fixedly secured to the four rigid elongate base members (1006, 1008) by tightening at least one nut-and-bolt fastener extending through at least one elongate slot of each L-shaped corner member.

2. The storm drain inlet protection system of claim 1, wherein the water permeable filtration material further comprises a cut-out section proximate to at least one of the plurality of slidable corner members.

3. The storm drain inlet protection system of claim 1, wherein at least a portion of the water permeable filtration material is wrapped about the adjustable frame.

4. The storm drain inlet protection system of claim 1, wherein the water permeable filtration material comprises one or more of paper, ceramic, polypropylene, acrylic fiber, glass fiber, polyester, spun cellulose, and rayon.

5. The storm drain inlet protection system of claim 1, wherein the water permeable filtration material is has one or more of double-seaming, a built-in scrim, or multiple layers.

6. The storm drain inlet protection system of claim 1, wherein at least one of the plurality of slidable corner members includes a cutout on an exterior corner portion of the respective slidable corner member.

7. The storm drain inlet protection system of claim 1, wherein the adjustable frame further comprises one or more tabs extending from one of more of the plurality of corner members, wherein each of the one or more tabs are foldable along a perforated connection between the respective tab and the adjustable frame.

8. The storm drain inlet protection system of claim 7, wherein the one or more tabs, when folded along the perforated connection, secure the adjustable frame in place with respect to a grate.

9. The storm drain inlet protection system of claim 8, wherein the one or more tabs are folded upwards, and wherein the grate sits atop the adjustable frame within the one or more tabs.

* * * * *